Figure 3:
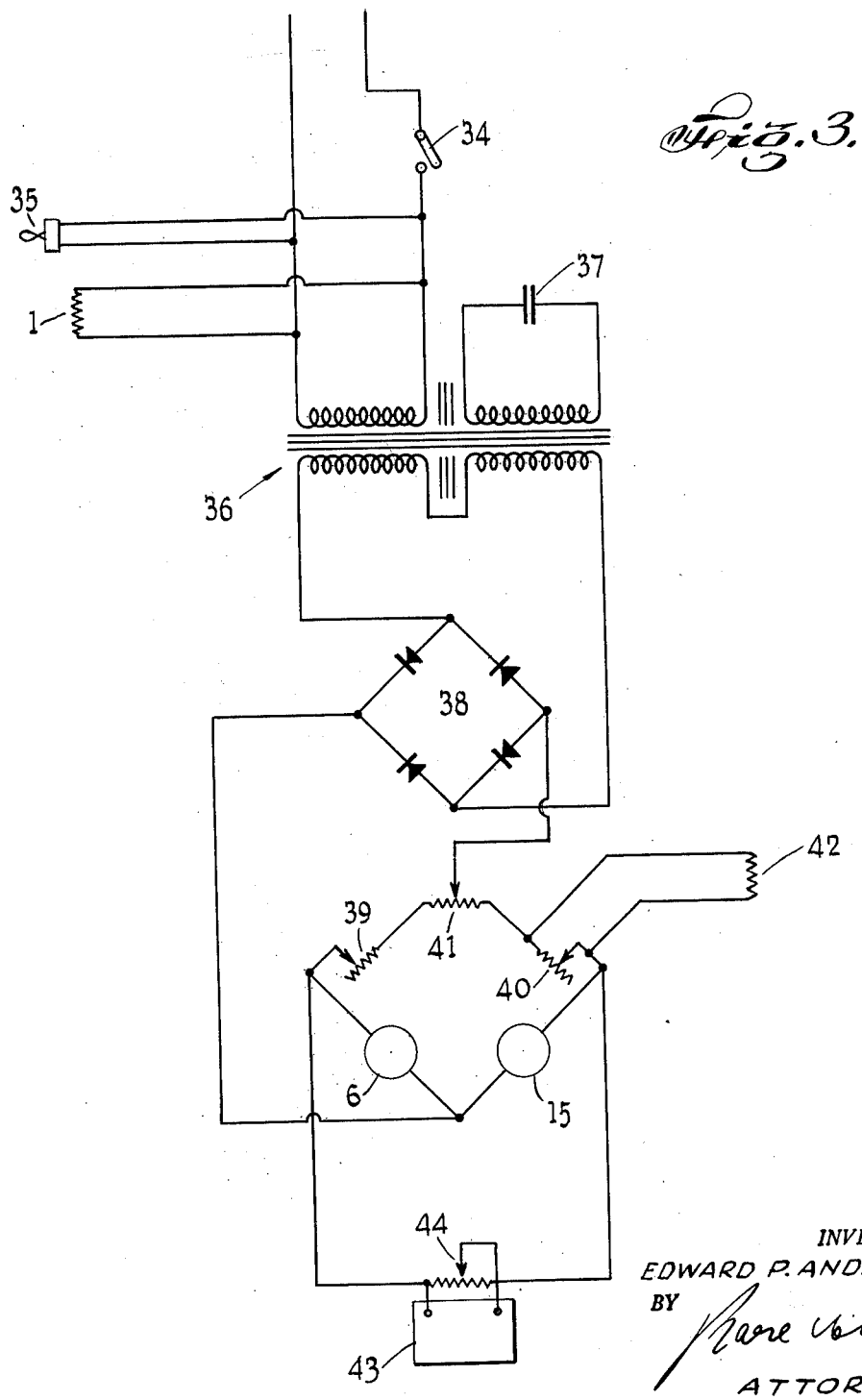

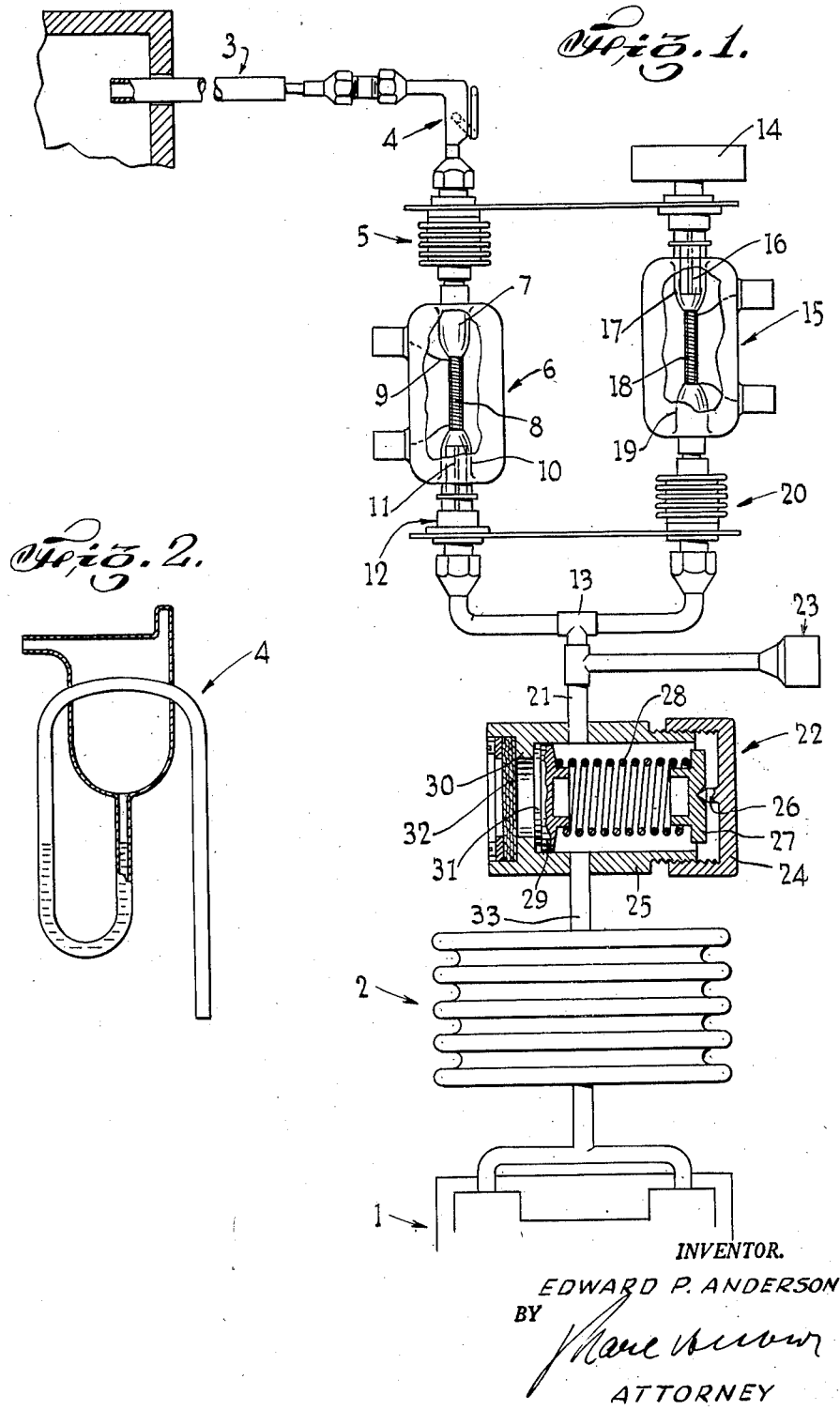

May 26, 1953     E. P. ANDERSON     2,639,610
FURNACE ATMOSPHERE INDICATOR

Filed Jan. 8, 1948     2 Sheets-Sheet 2

INVENTOR.
EDWARD P. ANDERSON
BY
ATTORNEY

Patented May 26, 1953

2,639,610

UNITED STATES PATENT OFFICE 2,639,610

FURNACE ATMOSPHERE INDICATOR

Edward P. Anderson, Teaneck, N. J., assignor to Charles Engelhard, Incorporated, East Newark, N. J., a corporation of New Jersey Application January 8, 1948, Serial No. 1,102

3 Claims. (Cl. 73—27)

The present invention relates to a furnace atmosphere indicator and more particularly to an apparatus for indicating the oxidizing or reducing potentialities of a furnace atmosphere.

Conventional devices for the analysis of gases strictly by thermal conductivity means usually have incorporated therein a conductivity cell comprising a heated element whose temperature is affected by the thermal conductivity of gases. Such devices are based upon the principle of comparing the thermal conductivities of a known gas and an unknown gas and measuring their relative difference. The relative difference between the gases is determined from the effect of their thermal conductivities upon identical heated elements. Although differences between gases can be measured by thermal conductivity methods, such methods as heretofore known cannot adequately indicate the relative oxidizing or reducing potentialities of the gases. One reason for the inability of these instruments to efficiently indicate an oxidizing or reducing atmosphere is that such conventional instruments based upon the thermal conductivity principle are not capable of taking into consideration the fact that some reducing gases, such as hydrogen and carbon dioxide, etc., produce opposite effects. These instruments have no provisions for enabling such gases to be compared with standard or comparison gases, i. e. air, so that the reducing potentialities can be definitely determined with respect to comparison gases without confliction or ambiguity; nor do these instruments have provisions for adjustment which can make the use of the instrument flexible by being capable of reversing the response to some gases or changing the response sensitivity to some gases.

The present invention is not restricted to the analysis of gaseous constituents of an atmosphere and does not have the disadvantages of gas analysis devices hereinbefore stated. This invention provides an apparatus having mechanical means or devices for adjustably varying the flow of gases through the apparatus and more particularly through flow sensitive cells for the purpose of enabling the flow sensitive cells to take into consideration the combined various physical properties of gases for the purpose of determining the potentialities, i. e. oxidizing or reducing potentialities, of gases or gaseous mixtures. This invention also provides means for making the instrument of the invention flexible by being capable of reversing the response to some gases or changing the response sensitivity to some gases. The term "potentialities" is used to designate the functional potential of a gas, which may not be apparent from the gas characteristics, with respect to a standard gas, i. e. air. The terms "oxidizing" and "reducing" according to this invention are purely relative with respect to another gas, or combination of gases, i.e. standard or comparison gases. For example, carbon dioxide is generally less oxidizing than air and may be so indicated on a meter incorporated in the apparatus, while hydrogen would be less oxidizing to the extent that it would indicate as reducing. The invention provides an instrument for continuous reading throughout the range of oxidizing and reducing atmospheres without ambiguous zones as may be found in indications by conventional physical gas analysis instruments which do not use the mechanical means for adjustably varying the flow of gases as in accordance with the present invention.

It is an object of this invention to provide an apparatus adapted to utilize several physical characteristics of gases or gaseous mixtures, i. e. viscosity, molecular size, etc., for the determination of the relative oxidizing or reducing potentialities of gases or gaseous mixtures. It is another object of this invention to provide an apparatus for the continuous reading of the relative oxidizing or reducing potentialities of a furnace atmosphere with respect to a standard gas. It is a further object of this invention to provide an apparatus useful as a general tool for physical gas analysis. Other objects and advantages of the invention will become more apparent from the description thereof hereinafter following.

The invention is illustrated in the accompanying drawings forming part hereof, in which:

Figure 1 illustrates a schematic diagram on a horizontal plane of the pneumatic system of this invention with a regulator valve shown in cross-section, Figure 2 illustrates the moisture trap of this invention on a vertical plane, and Figure 3 illustrates a diagrammatic representation of the electrical circuit of this invention Referring to Figure 1, a pump 1, or other suitable motivating force, maintains a constant flow of gas through the apparatus with the aid of a gas dome 2 which is provided to reduce fluctuations of gas flow that may be due to pump characteristics. The pump draws a flow of gas or gaseous mixture from a furnace through a sampling tube 3 into a moisture trap 4 wherein moisture formation may be collected and prevented from further passage into the system.

The moisture trap is preferably constructed of glass and is designed to maintain a liquid seal, as particularly shown in Figure 2, whereby excess water may leave the moisture trap while a seal is maintained so that no air may enter into the system to contaminate the sample furnace gas. The furnace gas, substantially free of condensed moisture, passes through an expanding tube seat 5 which is in the form of a bellows and which provides a means for holding the gas cell 6 securely in position and at the same time allows the gas cell to be easily removed from the apparatus. Upon entering the gas cell 6, the furnace gas first enters the chamber 7 and then passes through the tube 8. Wound on the tube 8 is a heated element 9 which constitutes a balanced bridge circuit resistance hereinafter more particularly described. The gas cell 7 may be an evacuated cell and the heating element 9 may be hermetically sealed therein to reduce effects of ambient temperature and air drafts so that the temperature changes in the heated element are due mostly to the physical characteristics, i. e. viscosity, specific heat, etc., of the furnace gas passing through tube 8. After passing through the tube 8, the furnace gas flows into the chamber 10 which contains a removable capillary bleed 11. This capillary bleed is preferably of glass construction and is removably positioned against the seat 12 enabling easy substitution by another capillary bleed. The capillary bleed 11 meters the hot gas out of the gas cell so that the combined effects of the various physical properties of the furnace gas can be taken into account for determining the oxidizing or reducing potentialities of the gas before the gas passes into one arm of the T-shaped conduit 13.

At the same time that the pump 1 causes a flow of gas to leave the furnace, it also causes air to flow into the system through the filter 14. The air is metered into the air cell 15 through the capillary bleed 16 and enters the chamber 17 before flowing through the tube 18. After passing through the tube 18, the air enters the chamber 19 and flows through an expanding tube seat 20 into one arm of the T-shaped conduit 13.

The air cell 15 and its component parts are similar to the gas cell 6 and its component parts. Although the capillary bleed and expanding tube seat of the air cell 15 are oppositely positioned in respect to the positioning of the capillary bleed and the expanding tube seat of the gas cell 6, they may also be similarly positioned.

The construction and arrangement of the furnace gas cell and comparison cell are such that a flow of furnace gas is compared against a flow of a standard gas, i. e. air, for determining the difference between the combined effects of the various physical properties of furnace gas upon a heated element and the effects of a standard gas upon a similar heated element.

Both the furnace gas and the standard gas flow under equal motivating force through opposite arms of a T-shaped conduit 13 into a common tube 21 and into a pressure regulator valve 22. The pressure regulator valve is designed to leak whenever a suction greater than a set value is applied to the regulator.

The set value, or optimum pressure for the system, is indicated by any suitable pressure gauge connected to the test vent 23, which is normally capped during the operation of the apparatus. The pressure regulator 22 has a cap 24 which is threaded to the regulator housing 25. The cap 24 has a centrally located projection 26 which presses against a bushing 27 inserted into the end of a loading spring 28. The loading spring presses a valve bushing 29 against a seat 30 which is part of the regulator housing. The valve bushing may be faced with a rubber surface 31. A filter 32 is used in the vent of this regulator to keep the valve seat clean. The leak suction pressure is selected by rotating the threaded cap 24. A flow of gas leaving the pressure regulator enters the tube 33 and flows through the flexible air dome 2, which dampens the pressure throbs of the pump, and out of the apparatus through the pump.

Figure 3 illustrates the electrical circuit utilized in conjunction with the pneumatic system hereinbefore described.

The apparatus may operate from a suitable power supply such as 110 volts 60 cycles. When the switch 34 is closed an indicator light 35 shows that the system is activated. A constant voltage transformer 36 used with a condenser 37 supplies the proper regulated voltage (approximately 18 volts) to the full rectifier bridge 38. The rectified supply is impressed across a resistance bridge consisting of two arms 9 and 9', as more particularly illustrated in Figure 1, two balancing resistances 39 and 40, a trimming resistance 41, and across a thermal compensating resistance 42. The degree of bridge unbalance which is indicated on the meter 43 can be controlled for sensitivity by the adjustable resistance 44.

As the furnace gas and standard gas flow through their respective flow sensitive cells simultaneously under equal motivating force, the heated elements, i. e. the heated element 9 of the gas cell 6 and the heated element of the air cell 15, which is identical with the heated element 9, are influenced by the combined various physical properties of the gases passing through the cells. The heated elements in the form of a coiled filament or wire each represent an arm of the balanced bridge as indicated in Figure 3 and may comprise a metal of the platinum group, e. g. platinum. Nickel, or any other material whose thermal electrical resistivity co-efficient is applicable, may be used. It is known that the nature of the flowing gases will influence the temperature of the heated elements so that a difference in the change in the resistivity between both heated elements will create a voltage unbalance to an extent that gases can be compared according to the rate that they extract heat from a heated element. However, the physical effects are so interrelated and complex that the quantitative value of each contributing effect of the combined various physical properties of the gases is not known. Nevertheless, some predetermined total effect, such as oxidation, is reflected in the results obtained from the combined physical properties of the gases when the effects of the combined physical properties of the gases are so related to each other, i. e. furnace gas with air, by adjustments of the instrument, that the oxidizing or reducing potentialities of gases can be indicated on a meter. The above-mentioned adjustments may be any of several simple changes in the existing fundamentals such as a change in the bridge voltage, the substitution of different capillaries or the addition or elimination of at least one capillary, a change in pressure differential under which the gases are moved through the system.

The arrangement consisting of a capillary bleed positioned in a chamber, i. e. the capillary bleed 11 positioned in the chamber 10, provides a means by which the physical characteristics and flow of furnace gases will affect the rate of heat extraction from the hot filament thus affording a bridge unbalance to furnish a meter reading. For example, although the specific heat of a furnace gas has an effect upon the heater element, the rate of flow of the furnace gas also affects the heater element. I control the rate of flow of the furnace gas through the tube 8 according to the flow resistance of the furnace gas through the capillary bleed 11. Similarly, the arrangement of the capillary bleed 16 and the heater element affect the rate of flow of air through the air cell 15, which is related to the flow through cell 6 because as the temperature of one cell increases, its resistance increases, the current decreases, and the temperature of the second cell falls off which in turn, decreases the viscosity and increases the flow through the particular cell.

As the physical properties of a standard gas, i. e. air, differ from the physical properties of furnace gas, the rate of flow through the gas cell and comparison or air cell will not be the same even under a common motivating force and, therefore, contribute to the rate of heat extraction of the furnace gas and air toward effecting a difference in change in the temperature and, therefore, the resistance of the heated elements of the gas cell and air cell. The additive effects of the physical properties of furnace gases contributing to the rate of heat extraction will largely eliminate ambiguous zones in the determination of the oxidizing and reducing potentialities of a furnace atmosphere.

Although the change in temperature of the heater elements is effected by the combined various physical properties of a furnace gas and a standard gas, both gases having substantially the same temperature, any change of temperature of the heated elements which may possibly occur due to ambient temperatures are compensated for by the thermal compensating resistance 42.

The bridge unbalance in the electrical bridge circuit furnishes a voltage difference across the bridge circuit and is used to operate a meter 43, i. e. a galvanometer, or other suitable unit for continuous reading, to indicate, record or control the relative oxidizing or reducing condition of a furnace atmosphere.

Although the instrument of the present invention is not restricted to the analysis of gaseous constituents of an atmosphere, it may be used for physical gas analysis without departing from the scope of the invention in view of the fact that the instrument possesses a flexibility relative to and in accordance with its ability for various adjustments as hereinbefore stated. The instrument may be used in conjunction with a suitable recorder, to indicate, record or control a characteristic of a gas or gaseous mixture. Such characteristic, i. e. toxicity, specific gravity, viscosity, etc., may be indicated, recorded or controlled by following an empirical procedure, which, nevertheless, is sufficient for many applications. The instrument, therefore, constitutes a new device for the physical analysis of gases.

What I claim is:

1. An apparatus for determining the functional potential of a gaseous atmosphere composed of at least one gas of the group consisting of oxidizing gases and reducing gases in comparison with air, said apparatus comprising in combination a pump for maintaining a flow of gas from a gas source through a plurality of cells, an expanding gas dome positioned between said cells and said pump for reducing fluctuations in gas flow due to pump characteristics, a valve positioned between said gas dome and said cells for regulating the flow of gas through said cells, each of said cells comprising a tube for the passage of gas through said cells, an electrical resistance heating means wound on said tube, a chamber positioned at each end of said tube and formed by an envelope surrounding said electrical resistance means, a capillary bleed positioned in said chamber for metering the flow of gas through said tube, a bridge circuit connected to said electrical resistance means forming two arms of said circuit, one of said cells being connected to a source of said atmosphere, another of said cells being connected to a source of air, said cells being held in position within said apparatus by means of an expanding tube seat allowing easy removal of said cells from said apparatus, a meter connected in said circuit for indicating the relative potentiality of said atmosphere in comparison with air.

2. Gas testing apparatus comprising a tubular envelope, a tube axially located through said envelope and open at each end thereof for permitting the passage of gas therethrough, said envelope being sealed to said tube to form a closed chamber around said tube, the end walls of said envelope extending beyond the ends of said tube and then reentrantly formed to contact said tube forming a recess at each end of said tube, said chamber being evacuated, a resistance heating element in said chamber and wound around said tube, terminals on the outside of said envelope, the ends of said resistance element being electrically connected to said terminals whereby said element may be electrically energized.

3. Gas testing apparatus according to claim 2, comprising a capillary bleed positioned in said recess for metering the flow of gas through said tube.

EDWARD P. ANDERSON.

References Cited in the file of this patent

UNITED STATES PATENTS

| Number | Name | Date |
|---|---|---|
| 1,467,084 | Bassett | Sept. 4, 1923 |
| 1,643,155 | Eisenschitz | Sept. 20, 1927 |
| 1,698,887 | Krueger | Jan. 15, 1929 |
| 1,715,374 | Krueger | June 4, 1929 |
| 1,904,819 | Blodgett | Apr. 18, 1933 |
| 2,010,995 | Jacobson | Aug. 13, 1935 |
| 2,149,441 | Jacobson | Mar. 7, 1939 |
| 2,256,395 | Laub | Sept. 16, 1941 |

FOREIGN PATENTS

| Number | Country | Date |
|---|---|---|
| 465,367 | Germany | Sept. 15, 1928 |

OTHER REFERENCES

"Brown Electric $CO_2$ Meters," Catalog 3004 (1931).